US009150218B2

(12) United States Patent
Makabe et al.

(10) Patent No.: US 9,150,218 B2
(45) Date of Patent: Oct. 6, 2015

(54) HYBRID VEHICLE (71) Applicant: HONDA MOTOR CO.., LTD., Tokyo (JP)

(72) Inventors: Tatsuya Makabe, Wako (JP); Yoshiki Tatsutomi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 380 days.

(21) Appl. No.: 13/847,088

(22) Filed: Mar. 19, 2013

(65) Prior Publication Data

US 2013/0282215 A1 Oct. 24, 2013

(30) Foreign Application Priority Data

Mar. 30, 2012 (JP) .................... 2012-079024

(51) Int. Cl.
*B60W 20/00* (2006.01)
*B60W 10/06* (2006.01)
*B60W 10/02* (2006.01)
*B60K 6/48* (2007.10)

(52) U.S. Cl.
CPC ............... *B60W 20/40* (2013.01); *B60K 6/48* (2013.01); *B60W 10/02* (2013.01); *B60W 10/06* (2013.01); *B60K 2006/4825* (2013.01); *B60W 2510/0652* (2013.01); *B60W 2520/10* (2013.01); *B60W 2600/00* (2013.01); *B60W 2710/0644* (2013.01); *Y02T 10/6221* (2013.01); *Y02T 10/6252* (2013.01); *Y02T 10/7258* (2013.01); *Y10S 903/93* (2013.01)

(58) Field of Classification Search
CPC ............. Y10S 903/93; Y10S 903/946; Y02T 10/6221; Y02T 10/6247; Y02T 10/6252; Y02T 10/7258; B60W 10/02; B60W 10/06; B60W 20/40; B60W 2710/0644
See application file for complete search history.

(56) References Cited

U.S. PATENT DOCUMENTS

| 5,656,921 | A | * | 8/1997 | Farrall | 322/40 |
| 5,697,466 | A | * | 12/1997 | Moroto et al. | 180/65.25 |
| 5,789,882 | A | * | 8/1998 | Ibaraki et al. | 318/148 |
| 6,175,785 | B1 | * | 1/2001 | Fujisawa et al. | 701/22 |
| 6,203,468 | B1 | * | 3/2001 | Nitta et al. | 477/5 |
| 6,336,889 | B1 | * | 1/2002 | Oba et al. | 477/5 |
| 7,520,351 | B2 | * | 4/2009 | Uchisasai et al. | 180/65.245 |
| 8,386,107 | B2 | * | 2/2013 | Shimanaka | 701/22 |
| 8,790,215 | B2 | * | 7/2014 | Sujan et al. | 477/5 |
| 2006/0180363 | A1 | * | 8/2006 | Uchisasai et al. | 180/65.2 |

(Continued)

FOREIGN PATENT DOCUMENTS

JP    3480316 B2    10/2003

*Primary Examiner* — Helal A Algahaim
*Assistant Examiner* — Donald J Wallace
(74) *Attorney, Agent, or Firm* — Squire Patton Boggs (US) LLP (57) ABSTRACT A mechanism and the like configured to reduce a shock involved in the connection of the engine is made no longer necessary for a hybrid vehicle, and an increase in the number of parts of the hybrid vehicle is inhibited. A clutch is connected between an electric motor and an engine in a case where a difference between a current engine speed and a target engine speed is not greater than a first predetermined value. The absolute value of a difference between the current engine speed and a moving average value of the engine speed at intervals of a predetermined length of time is not greater than a second predetermined value which is used for a settling judgment. The engine speed shows a predetermined inclination representing a decreasing trend.

13 Claims, 6 Drawing Sheets

(56) References Cited

U.S. PATENT DOCUMENTS

| | | | |
|---|---|---|---|
| 2008/0228363 A1* | 9/2008 | Kouno et al. | 701/54 |
| 2009/0143950 A1* | 6/2009 | Hasegawa et al. | 701/68 |
| 2009/0156355 A1* | 6/2009 | Oh et al. | 477/5 |
| 2009/0222231 A1* | 9/2009 | Berger et al. | 702/104 |
| 2009/0240387 A1* | 9/2009 | Kawai et al. | 701/22 |
| 2011/0087394 A1* | 4/2011 | Shimanaka | 701/22 |
| 2012/0065822 A1* | 3/2012 | Ishiguro | 701/22 |
| 2012/0208672 A1* | 8/2012 | Sujan et al. | 477/5 |
| 2013/0131903 A1* | 5/2013 | Araki | 701/22 |

* cited by examiner

HYBRID VEHICLE

BACKGROUND

1. Field

The present invention relates to a hybrid vehicle equipped with a power plant including an electric motor and an internal combustion engine.

2. Description of the Related Art

Hybrid vehicles include a hybrid vehicle of a type which connects engine power via a torque converter or the like for the purpose of dampening shock which occurs when the engine power is connected in conjunction with switching the driving mode from an EV driving mode, in which the engine power is disconnected, to an engine driving mode in which the engine power is connected (see, for example, Japanese Patent No. 3480316).

The hybrid vehicle of the foregoing type uses a technique of reducing the shock through partial clutch engagement or by use of the torque converter in reconnection, but has a problem that the control is complicated and the number of needed parts such as a sensor is vast.

SUMMARY

Against this background, an object of the present invention is to make a mechanism and the like for reducing the shock involved in the connection of the engine no longer necessary for the hybrid vehicle, and to prevent an increase in the number of parts.

For the purpose of solving the above problem, a first aspect of the present invention is a hybrid vehicle equipped with a power plant including an electric motor and an engine. The vehicle can include a clutch configured to connect and disconnect the engine to and from a driving wheel and the electric motor in a way that enables power to be transmitted, the electric motor being always capable of transmitting power to the driving wheel. A throttle by wire system can be configured to link a throttle valve of the engine and an acceleration operator together. A controller can be configured to control operation of the power plant. The controller can include vehicle speed calculating means for calculating a vehicle speed from the number of revolutions of the electric motor. Target engine speed determining means can be provided, for determining a target engine speed from the calculated vehicle speed in a case where the engine is started while the vehicle is in a state of being run by the electric motor. Start controlling means are provided for starting the engine once the vehicle speed reaches a predetermined one while the vehicle is in the state of being run by the electric motor, temporarily increasing the engine speed in a way that makes the engine speed become larger than the determined target engine speed, and thereafter making the engine speed become equal to the target engine speed by gradually decreasing the temporarily increased engine speed. Moving average calculating means can be provided for detecting the engine speed by use of an engine speed sensor, and for calculating a moving average value of the engine speed at intervals of a predetermined length of time. Inclination calculating means are provided for calculating an inclination representing a change in the engine speed with time from an increase and decrease in the moving average value. Clutch controlling means can be provided for controlling the connection and disconnection of the clutch. The clutch controlling means connects the clutch in a case where a difference between a current engine speed detected by the engine speed sensor and the target engine speed determined by the target engine speed determining means is not greater than a first predetermined value, the absolute value of a difference between the current engine speed and the moving average value calculated by the moving average calculating means is not greater than a second predetermined value which is used in a settling judgment, and where the inclination calculated by the inclination calculating means takes on a value representing a decreasing trend.

A second aspect of the present invention is wherein the controller further comprises throttle opening angle determining means for determining an opening angle of the throttle valve of the engine from the target engine speed, while the clutch controlling means puts the driving wheel and the electric motor in a state of being connected to the engine via the clutch in the way that enables the power to be transmitted. The throttle valve is gradually opened on the basis of a throttle opening angle determined by the throttle opening angle determining means. If a value obtained by subtracting the engine speed of a predetermined length of time earlier from the current engine speed is greater than 0, it is judged that the engine speed is in an increasing trend. If the current engine speed is greater than the target engine speed beyond the second predetermined value, an opening of the throttle valve is increased, and a mode of the hybrid vehicle is switched from a motor driving mode to an engine driving mode.

A third aspect of the present invention is wherein the controller increases the opening of the throttle valve after the predetermined length of time.

A fourth aspect of the present invention is wherein zero torque control is performed on the electric motor after the transition to the engine driving mode.

According to the first aspect of the invention, the timing for connecting the clutch can be judged by only detecting the number of motor revolutions of the electric motor and the engine speed of the engine.

According to the second aspect of the invention, the drive of the engine outnumbers the drive of the motor as the throttle valve is gradually opened, when a mode of the hybrid vehicle is switched from the motor driving mode to the engine driving mode after the clutch connection. For this reason, the engine speed becomes greater than the target engine speed. This makes it possible to detect the timing when a mode of the hybrid vehicle has been switched from the motor driving mode to the engine driving mode. Accordingly, it becomes easy to switch the motor torque to the engine torque, and the motor driving mode is efficiently switched to the engine driving mode.

According to the third aspect of the invention, the transition to the engine driving mode can be completed within the predetermined length of time by gradually opening the throttle valve, as well as it is possible to complete the driving mode switching and increase the opening of the throttle valve after the predetermined length of time even if the foregoing prerequisites are not necessarily satisfied.

According to the fourth aspect of the invention, the electric motor can be controlled in order that the electric motor should not exert friction after the transition to the engine driving mode, and accordingly the electric motor does not become a load during running.

DETAILED DESCRIPTION

Descriptions will be hereinbelow provided for embodiments of the present invention by referring to the drawings.

Figure 1:
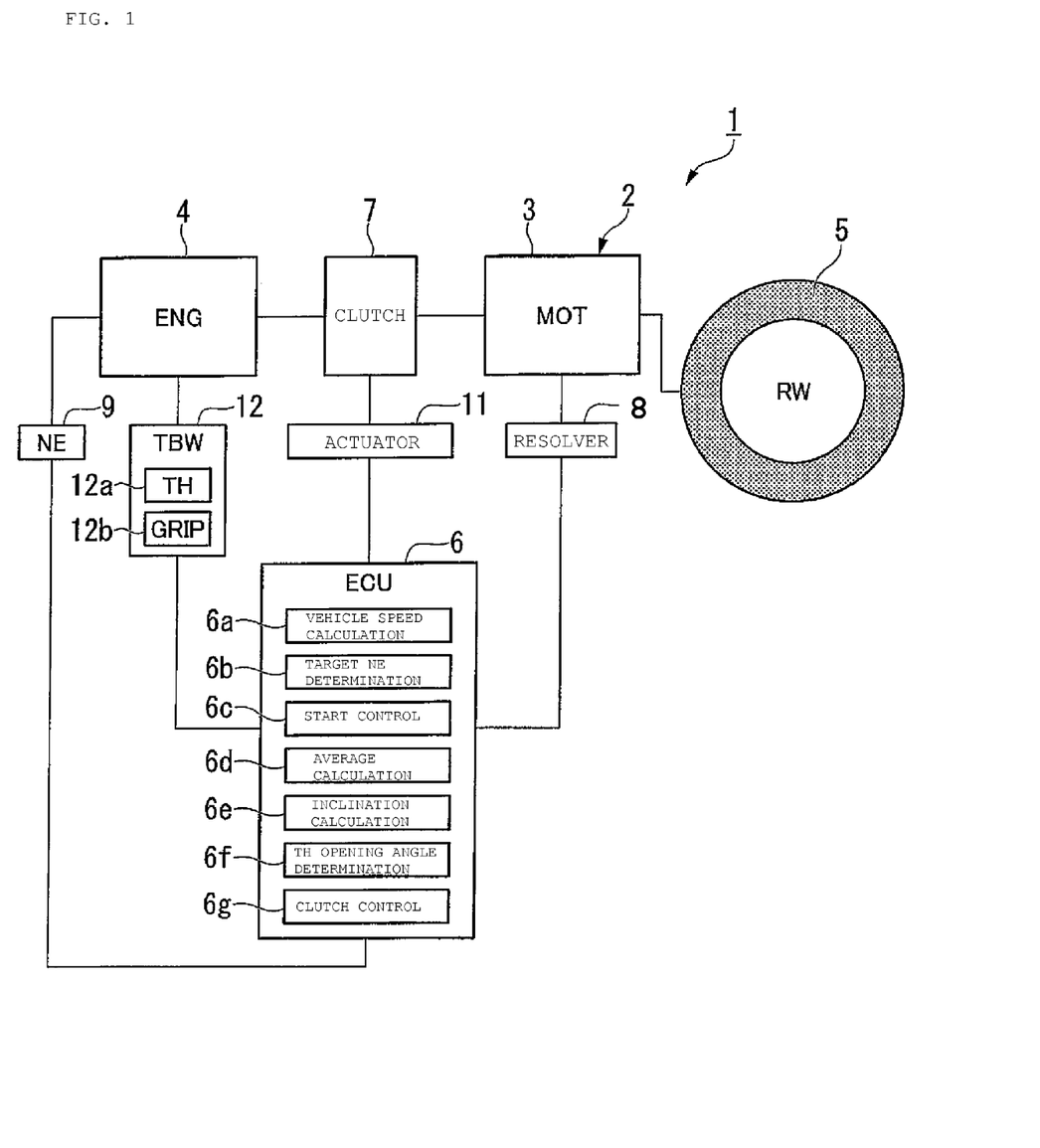
FIG. 1 is a schematic diagram of a hybrid vehicle of an embodiment of the present invention.

FIG. 1 shows mainly the schematic configuration of a hybrid vehicle 1 of an embodiment of the invention. The hybrid vehicle 1 is equipped with a power plant 2 including an electric motor 3 and an engine 4, such as an internal combustion engine, for running the vehicle by, for example, driving a wheel. The hybrid vehicle 1 of the embodiment is shaped like a motorcycle, for example, and runs by driving rear wheel 5 as a driving wheel while switching or combining the power of an electric motor 3 and the power of the engine 4 as needed. The hybrid vehicle 1 can include energy storage means such as a battery, which is not illustrated. While decelerating, the hybrid vehicle 1 converts kinetic energy into electric energy by using the electric motor 3 as a power generator, and thereby charges or regenerates the battery, as well as obtains a regenerative brake or electric brake effect. The operations respectively of the electric motor 3, the engine 4 and a clutch 7 are controlled by an electronic control unit (ECU) 6 in a unified manner.

A motor drive shaft of the electric motor 3 is connected to the rear wheel 5 in a way that enables power to be transmitted from the motor 3 to the rear wheel 5. An engine drive shaft of the engine 4 is connected to the motor drive shaft via the clutch 7 in a way that enables the power transmission to be connected and disconnected. The number of revolutions of the motor or motor drive shaft is detected by a motor revolution number sensor 8 like a resolver. The number of revolutions of the engine drive shaft is the engine speed, and is detected by an engine speed sensor 9 like a pulse sensor. The connection and disconnection of the clutch 7 is controlled by the operation of a clutch actuator 11. The engine speed is controlled by a throttle by wire (TBW) 12 including a throttle valve 12a and an acceleration grip 12b.

Figure 2:
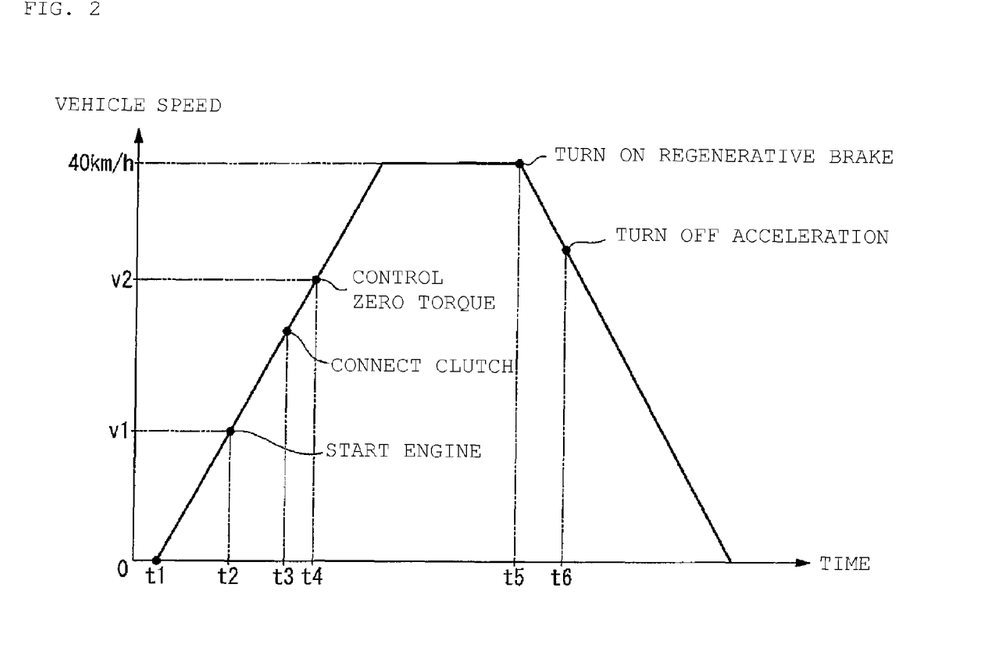
FIG. 2 is a graph showing how the vehicle speed of the hybrid vehicle changes with time.

Referring to FIG. 2, descriptions will be provided for how basic control of the hybrid vehicle 1 is carried out by the ECU 6. It should be noted that the timing of the disconnection and reconnection of the engine power varies depending on various factors such as the required output such as the amount of manipulation of the acceleration grip 12b by a driver, the vehicle speed, and the condition of the battery. For this reason, FIG. 2 shows a case where the vehicle speed varies within a range of 0 to 40 km/h as an example.

While the hybrid vehicle 1 stops (at a vehicle speed of 0 km/h at and before timing t1 in the drawing), the engine 4 stops its operation, and the supply of the electric power to the electric motor 3 and the clutch actuator 11 is suspended. Once various operations inclusive of the manipulation of the acceleration grip 12b for its opening by the driver is carried out while in this state, the engagement of the clutch 7 is released by supplying the electric power to the clutch actuator 11 in accordance with the operations, and the power transmission between the engine 4 and the electric motor 3 is thereby disconnected, while the electric motor 3 is driven by supplying the electric power to the electric motor 3. In FIG. 2, the hybrid vehicle 1 begins to run with only the power from the electric motor 3 at timing t1. It should be noted that because the operation of the clutch 7 varies depending on the battery charge status as well, the hybrid vehicle 1 is capable of running by use of the power from the engine 4 with the clutch 7 put in the engagement state if the amount of charges remaining in the battery is small. The way in which the hybrid vehicle 1 runs by use of only the power from the electric motor 3 is termed as a motor driving mode of the hybrid vehicle 1.

Subsequently, once the vehicle speed of the hybrid vehicle 1 reaches a predetermined set speed, such as speed v1, at timing t2 in FIG. 2, a starter motor (not illustrated) works and starts the engine 4 while the power transmission remains disconnected between the engine 4 and the electric motor 3. The set speed is determined from a map on the basis of the actual opening angle of the throttle valve 12a of the engine 4 and the vehicle speed.

Thereafter, as preparation for connecting the clutch 7, a below-described clutch engagement judgment is carried out for the purpose of making the engine speed equal to the number of motor revolutions. Afterward, the clutch actuator 11 is put into the engagement state at timing t3 in FIG. 2. Thereby, the engine 4 and the electric motor 3 are connected together via the clutch 7 in a way that enables the power to be transmitted with the engine speed made equal to the number of motor revolutions. The hybrid vehicle 1 begins to run by use of the power which is a combination of the power from the engine 4 and the power from the electric motor 3. The way in which the hybrid vehicle 1 runs by use of the power which is the combination of the power from the engine 4 and the power from the electric motor 3 is termed as a combination driving mode of the hybrid vehicle 1.

Figure 6:
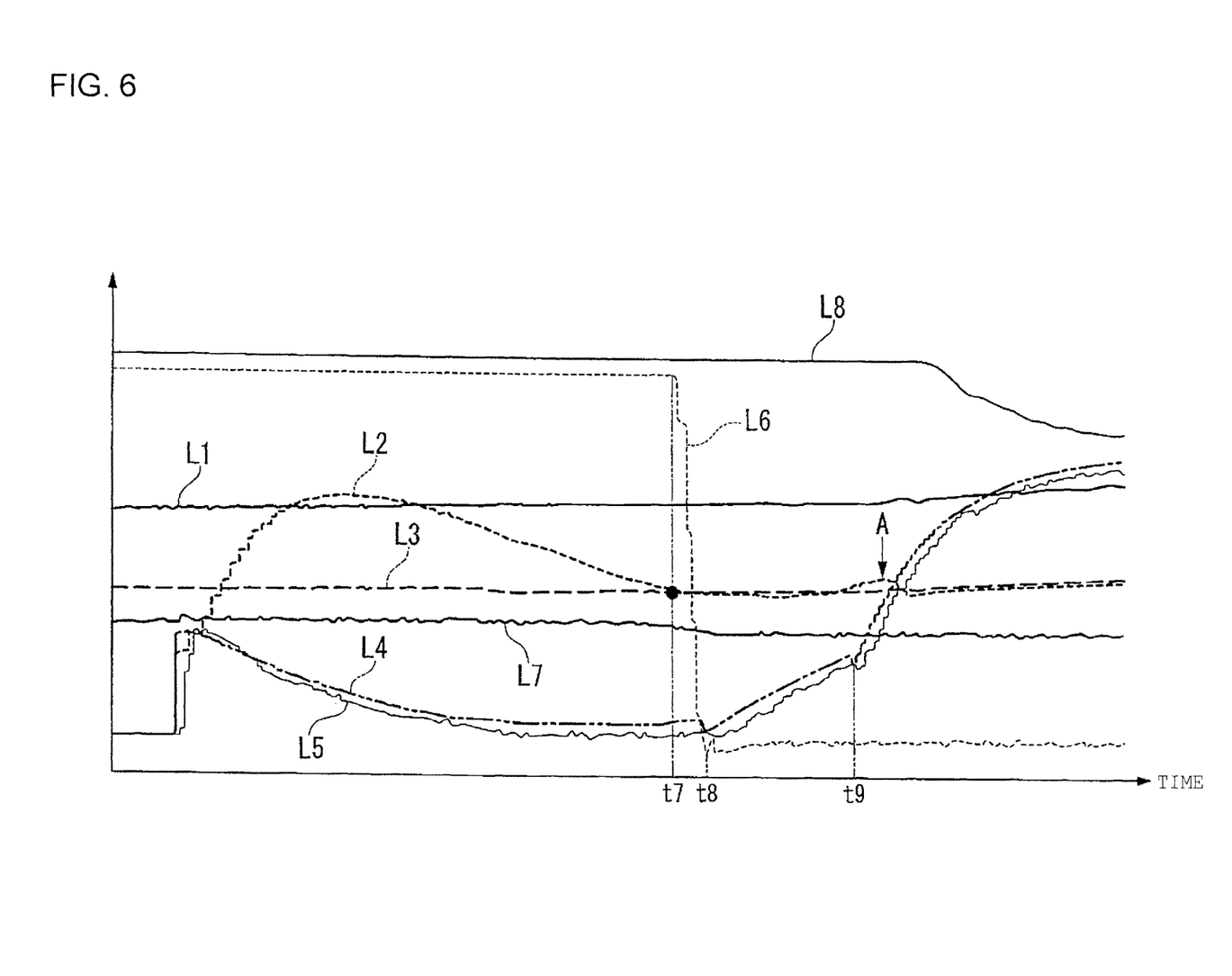
FIG. 6 is a graph showing how various controls of the hybrid vehicle change with time.

Once the torque of the electric motor 3 is switched to the torque of the engine 4 shown as part A in FIG. 6, the vehicle speed reaches a second predetermined set speed, v2 in FIG. 2 at timing t4. At this moment, zero torque control begins to be carried out for reducing the output torque from the electric motor 3 to zero by making a weak current flow to the electric motor 3 in accordance with the number of motor revolutions, and the hybrid vehicle 1 begins to run by use of only the power from the engine 4. The way in which the hybrid vehicle 1 runs by use of only the power from the engine 4 is termed as an engine driving mode of the hybrid vehicle 1.

Thereafter, once the acceleration grip 12b is manipulated for its closing, at timing t5 in the drawing, after the hybrid vehicle 1 runs at a constant vehicle speed of 40 km/h, deceleration due to the engine braking begins. At this moment, once the full closed state of the throttle valve 12a continues longer than a set length of time as shown at timing t6 in the drawing, the power transmission between the engine 4 and the electric motor 3 is disconnected by supplying the electric power to the clutch actuator 11, the engine brake is switched to the regenerative brake by the electric motor 3.

Figure 3:
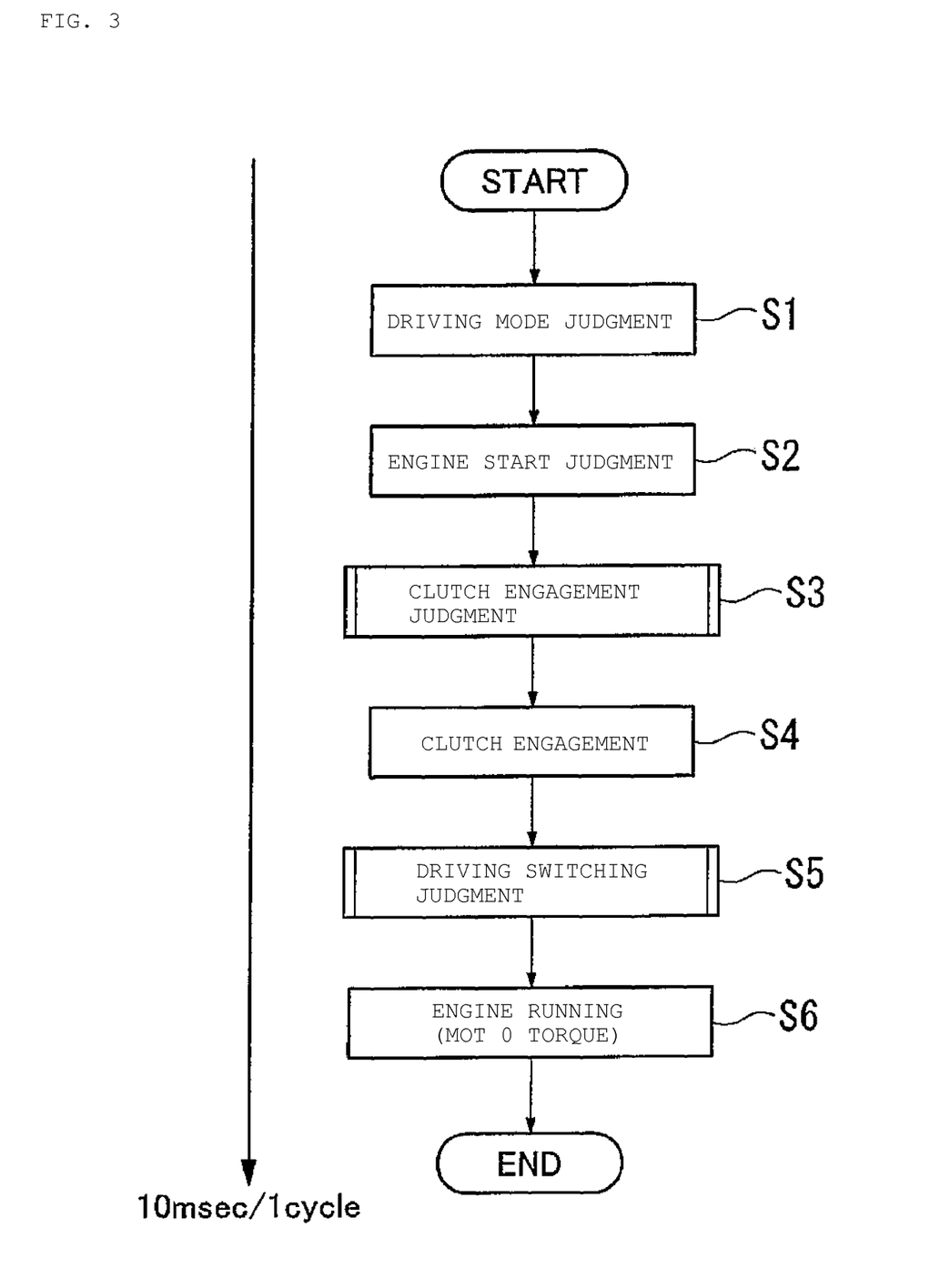
FIG. 3 is a flowchart in which basic processes of the hybrid vehicle are placed in sequential order.

FIG. 3 is a flowchart in which basic steps from the motor driving mode to the engine driving mode carried out by the ECU 6 are placed in sequential order. Each step is repeatedly carried out, for example, at predetermined intervals such as for example, at intervals of 10 milliseconds, once the main key of the hybrid vehicle 1 is turned on.

In step S1, it is judged which of the motor driving mode, the combination driving mode and the engine driving mode is the driving mode of the hybrid vehicle 1. In this embodiment, this judgment is made in accordance with mainly the vehicle speed. Instead, however, the judgment may be made with the opening acceleration (the degree of opening) of the acceleration grip 12b, the battery charge status and the like taken into consideration. In this embodiment, the vehicle speed is calculated from the number of revolutions of the electric motor 3 which is directly connected to the rear wheel 5.

In step S2, it is judged whether or not the engine 4 has been started from data detected by the engine speed sensor 9. If the engine 4 has been started, the clutch engagement judgment is carried out in step S3. Thereafter, the clutch 7 is engaged in step S4.

In step S5, it is judged whether or not the combination driving mode should be switched to the engine driving mode. If it is judged that the combination driving should be switched to the engine driving mode, the engine driving mode switches the combination driving mode by starting the zero torque control of the electric motor 3 in step S6.

In this respect, the graph in FIG. 6 shows a change with time in the vehicle speed calculated from the number of motor revolutions, and indicated by a line L1, of the hybrid vehicle 1 in transition from the motor driving mode to the engine driving mode through the combination driving mode. FIG. 6 also shows the engine speed indicated by a line L2, a target engine speed indicated by a line L3, an instructed opening angle of the throttle valve 12*a* indicated by a line L4, the actual opening angle of the throttle valve 12*a* indicated by a line L5, an ON/OFF signal of the clutch actuator 11 indicated by a line L6, an opening angle of the acceleration grip 12*b* indicated by a line L7, and a motor output torque, indicated by a line L8.

Referring to FIG. 6, the starter motor (not illustrated), is activated and thereby starts the engine 4, which has been stopped, at the predetermined timing when the vehicle speed of the hybrid vehicle 1 running in the motor driving mode does things such as reaching the predetermined set speed. At this moment, the line for the instructed and actual opening angles of the throttle valve 12*a* is activated as well. The target engine speed is set in accordance with the vehicle speed.

Right after the engine is started, the engine speed overshoots the target engine speed to a large extent. However, the engine speed gradually decreases and becomes equal to the target engine speed as the instructed and actual opening angles of the throttle valve 12*a* decrease.

After the time t7 when the engine speed becomes equal to the target engine speed after the overshoot, the clutch actuator 11 is put into an ON state at timing t8. Thereby, the electric motor 3 and the engine 4 are connected together via the clutch 7 in the way that enables power to be transmitted, and the hybrid vehicle 1 enters into the combination driving mode.

For a predetermined length of time after the engine 4 is connected to the electric motor 3, the instructed and actual opening angles of the throttle valve 12*a* are gradually increased in order that the engine speed should not become lower than the target engine speed due to drive load and the like.

Thereafter, the engine speed is increased by increasing the instructed and actual opening angles of the throttle valve 12*a* at and after timing 9 for the purpose of the transition from the combination driving mode to the engine driving mode. In this event, the engine speed exceeds the target engine speed, shown as part A in FIG. 6. Triggered by this, however, it is judged that the engine torque becomes larger than the motor torque. After that, the output from the electric motor 3 is gradually decreased, and the hybrid vehicle 1 enters into the zero torque control. With this, the hybrid vehicle 1 completes its transition to the engine driving mode.

As described above, the smooth transition from the motor driving mode to the engine driving mode can be achieved by the control based on mainly the data detected by the motor revolution number sensor 8 and the engine speed sensor 9.

Figure 4:
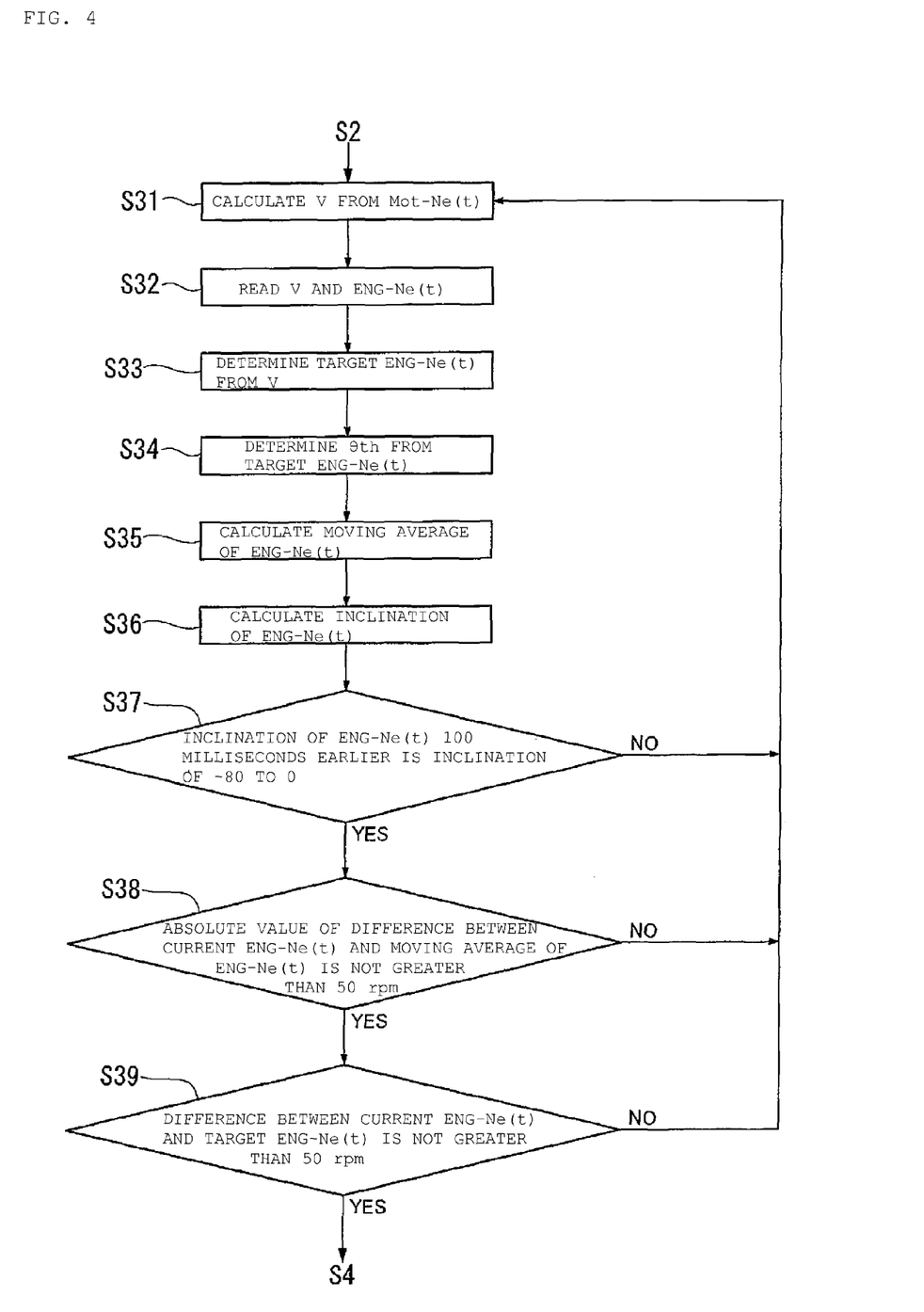
FIG. 4 is a flowchart showing how a process of judging clutch engagement is carried out by the hybrid vehicle.

Referring to FIG. 4, descriptions will be provided for how a process for the clutch engagement judgment is carried out in step S3. The vehicle speed is calculated in step S31 from the number of motor revolutions by a vehicle speed calculator 6*a* within the ECU 6. This vehicle speed, together with the engine speed, is read in step S32. Subsequently, the target engine speed is determined in step S33 from the vehicle speed by a target vehicle speed determiner 6*b* within the ECU 6. In addition, the opening angle of the throttle valve 12*a* is determined in step S34 from the determined target engine speed by a throttle opening angle determiner 6*f* within the ECU 6.

Subsequently, a moving average value of the engine speed at intervals of a predetermined length of time is calculated in step S35 by a moving average calculator 6*d* within the ECU 6. Furthermore, an inclination representing a change in the calculated moving average value with time is calculated in step S36 by an inclination calculator 6*e* within the ECU 6. The ECU 6 further includes a start controller 6*c* configured to start the engine 4, which has been stopped, when the vehicle speed reached a predetermined one while in the motor driving mode, and to smoothly make the engine speed become equal to the target engine speed.

The reason for the acquisition of the moving average value of the engine speed is that the engine speed sensor 9 outputs a detection value in each 14 milliseconds. Accordingly, detection values obtained at the respective output timings vary widely, and are not suitable to be used as data. With this taken into consideration, a value representing the engine speed is designed to be acquired in each 80 milliseconds. In this case, the engine speed sensor 9 outputs five values in each 80 milliseconds, and these values are averaged. Thereby, smooth data can be obtained.

The inclination representing the change in the moving average value with time can be obtained by dividing the difference between the latest engine speed (moving average value) and the engine speed of 100 milliseconds earlier by 100. The judgment on whether or not the engine speed is decreasing after the overshoot is achieved by judging in step S37 by an inclination judgment unit within the ECU 6 on whether or not the inclination is within a range of, for example, minus 80 to zero.

If YES in step S37, it is thereafter judged in step S38 by a clutch controller 6*g* within the ECU 6 whether or not the absolute value of the difference between the current engine speed (a detection value at the moment, but not the moving average value) and the latest moving average value is, for example, not greater than 50 rpm. Because the engine speed naturally fluctuates, it is judged in the embodiment that the engine speed is stable if the absolute value of the difference is not greater than 50 rpm as a settling judgment.

If YES in step S38, it is thereafter judged in step S39 by the clutch controller 6*g* whether or not the difference between the current engine speed and the target engine speed is, for example, not greater than 50 rpm. This judgment is made by use of a value representing the difference, which is not the absolute value of the difference, because the engine speed is in course of decreasing after the overshoot. If this judgment is YES, it is judged that the engine speed is controlled appropriately, and the sequence proceeds to step S4, where the clutch 7 is engaged by the control of the operation of the clutch actuator 11 by the clutch controller 6*g*. If NO in any one of steps S37 to S39, the sequence returns to step S31 and the processes are repeated.

Figure 5:
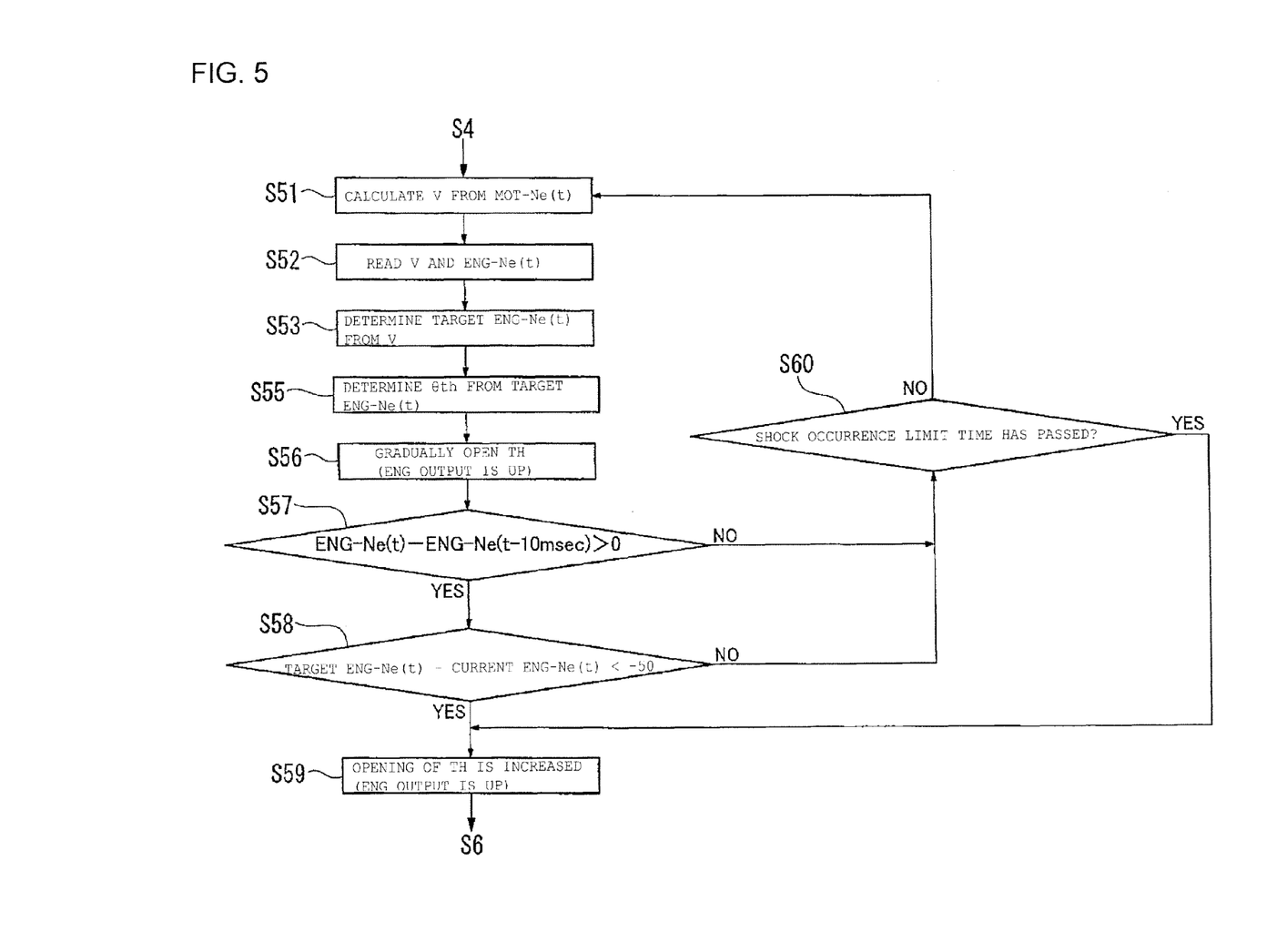
FIG. 5 is a flowchart showing how a process of switching driving modes to one another is carried out by the hybrid vehicle.

Referring to FIG. 5, descriptions will be provided for how the drive switching judgment in step S5 is carried out. The vehicle speed is calculated in step S51 from the number of motor revolutions by the vehicle speed calculator 6*a*. This vehicle speed, together with the engine speed, is read in step S52. Subsequently, the target engine speed is determined in step S53 from the vehicle speed by the target vehicle speed determiner 6b. In addition, the opening angle of the throttle valve 12a is determined in step S55 from the determined target engine speed by the throttle opening angle determiner 6f.

Thereafter, control for gradually opening the throttle valve 12a is carried out in step S56 by the throttle opening angle determiner 6f for the purpose of increasing the engine output. After that, it is judged by a second inclination judgment unit within the ECU 6 whether or not a value obtained by subtracting the engine speed of milliseconds earlier from the latest engine speed (moving average value) is a positive value; in other words, whether or not the engine speed is in course of increasing in step S57. If YES in step S57, it is judged by a second difference calculator within the ECU 6 whether or not a value obtained by subtracting the current engine speed from the target engine speed is less than 50 rpm, corresponding to the difference which is used in the settling judgment, in step S58. If YES in step S58, the opening of the throttle valve 12a is increased in step S59 by the throttle opening angle determiner 6f for the purpose of increasing the engine output.

If NO in any one of steps S57 and S58, it is judged by a time measuring unit within the ECU 6 whether or not a shock occurrence limit time has passed in step S60. To this end, a time when a shock may occur is grasped on the basis of experimental values. If the time has not passed yet, the process is terminated without increasing the opening of the throttle valve 12 even if the shock is detected. If the time has passed, the opening of the throttle valve 12a is opened even if the shock is detected.

As described above, the hybrid vehicle 1 of the embodiment is equipped with the power plant 2 including the electric motor 3 and the engine 4. The hybrid vehicle 1 can include the clutch 7 configured to connect and disconnect the engine 4 to and from the rear wheel 5 and the electric motor 3 in a way that enables the power to be transmitted, and the electric motor 3 being always capable of transmitting power to the driving wheel 5. The throttle by wire 12 configured to link the throttle valve 12a of the engine 4 and the acceleration grip 12b together. The ECU 6 configured to control the operation of the power plant 2.

The ECU 6 can include the vehicle speed calculator 6a configured to calculate the vehicle speed from the number of revolutions of the electric motor 3, and the target engine speed determiner 6b configured to determine the target engine speed from the calculated vehicle speed in a case where the engine 4 is started while the vehicle is in the state of being run by the electric motor 3. The start controlling controller 6c can be configured to start the engine 4 once the vehicle speed reaches a predetermined one while the vehicle is in the state of being run by the electric motor 3, to temporarily increase the engine speed in a way that makes the engine speed become larger than the determined target engine speed, and thereafter to make the engine speed become equal to the target engine speed by gradually decreasing the temporarily increased engine speed. The moving average calculator 6d can be configured to detect the engine speed by use of the engine speed sensor 9, and to calculate the moving average value of the engine speed at intervals of the predetermined length of time. The inclination calculator 6e can be configured to calculate the inclination representing the change in the engine speed with time from the increase and decrease in the moving average value; and the clutch controller 6g configured to control the connection and disconnection of the clutch 7.

The ECU 6 connects the clutch 7 in a case where the difference between the current engine speed and the target engine speed is not greater than a first predetermined value, the absolute value of the difference between the current engine speed and the moving average value is not greater than a second predetermined value which is used in the settling judgment, and a case where the engine speed shows the predetermined inclination representing a decreasing trend.

This configuration makes it possible to judge the timing for connecting the clutch by only detecting the number of motor revolutions of the electric motor 3 and the engine speed of the engine 4.

In the hybrid vehicle 1, the ECU 6 includes the throttle opening angle determiner 6f configured to determine the opening angle of the throttle valve 12a of the engine 4 from the target engine speed, and gradually opens the throttle valve 12a on the basis of the throttle opening angle determined by the throttle opening angle determiner 6f while the clutch 7 is put in the state of connecting the engine 4 to the rear wheel 5 and the electric motor 3 in the way that enables the power to be transmitted.

In this event, if the value obtained by subtracting the engine speed of a predetermined length of time earlier from the current engine speed is greater than (zero), it is judged that the engine speed is in an increasing trend. In addition, if the current engine speed is greater than the target engine speed beyond the second predetermined value, the motor driving mode is switched to the engine driving mode by increasing the opening of the throttle valve 12a.

In this configuration, the drive of the engine 4 outnumbers the drive of the motor as the throttle valve 12a is gradually opened, when the motor driving mode is switched to the engine driving mode after the clutch connection. For this reason, the engine speed is greater than the target engine speed. This makes it possible to detect the timing when the motor driving mode has been switched to the engine driving mode. Accordingly, it becomes easy to switch the motor torque to the engine torque, and the motor driving mode is efficiently switched to the engine driving mode.

In the hybrid vehicle 1, the ECU 6 increases the opening of the throttle valve 12a after the predetermined length of time.

This configuration makes it possible to complete the transition to the engine driving mode within the predetermined length of time by gradually opening the throttle valve 12a, as well as to complete the driving mode switching and increase the opening of the throttle valve 12a after the predetermined length of time even if the foregoing prerequisites are not necessarily satisfied.

In the hybrid vehicle 1, the zero torque control is performed on the electric motor 3 once the transition to the engine driving mode is completed.

This configuration makes it possible to control the electric motor 3 in order that the electric motor 3 should not exert friction after the transition to the engine driving mode, and accordingly prevents the electric motor 3 from becoming a load during running.

It should be noted that the present invention is not limited to the foregoing embodiment. It is a matter of course that the application of the present invention is not limited to the motorcycle. The present invention can be variously modified within a scope not departing from the gist of the present invention.

EXPLANATION OF THE REFERENCE NUMERALS

1 HYBRID VEHICLE
2 POWER PLANT

3 ELECTRIC MOTOR
4 ENGINE
5 REAR WHEEL (DRIVING WHEEL)
6 ECU (CONTROLLER)
7 CLUTCH
12 THROTTLE BY WIRE (THROTTLE BY WIRE SYSTEM)
12a THROTTLE VALVE
12b ACCELERATION GRIP (ACCELERATION OPERATOR)
6a VEHICLE SPEED CALCULATOR (VEHICLE SPEED CALCULATING MEANS)
6b TARGET ENGINE SPEED DETERMINER (TARGET ENGINE SPEED DETERMINING MEANS)
6c START CONTROLLER (START CONTROLLING MEANS)
6d MOVING AVERAGE CALCULATOR (MOVING AVERAGE CALCULATING MEANS)
6e INCLINATION CALCULATOR (INCLINATION CALCULATING MEANS)
6f THROTTLE OPENING ANGLE DETERMINER (THROTTLE OPENING ANGLE DETERMINING MEANS)
6g CLUTCH CONTROLLER (CLUTCH CONTROLLING MEANS)
9 ENGINE SPEED SENSOR

The invention claimed is:

1. A hybrid vehicle equipped with a power plant including an electric motor and an engine, said hybrid vehicle comprising:
a clutch configured to connect and disconnect the engine to and from a driving wheel and the electric motor in a way that enables power to be transmitted, the electric motor being configured to transmit power to the driving wheel;
a throttle by wire system configured to link a throttle valve of the engine and an acceleration operator together; and
a controller configured to control operation of the power plant, said controller comprising:
a vehicle speed calculating unit configured to calculate a vehicle speed from the number of revolutions of the electric motor;
a target engine speed determining unit configured to determine a target engine speed from the calculated vehicle speed in a case where the engine is started while the vehicle is in a state of being run by the electric motor;
a start controlling unit configured to start the engine once the vehicle speed reaches a predetermined speed while the vehicle is in the state of being run by the electric motor, and thus to temporarily increase the engine speed in a way that makes the engine speed become larger than the determined target engine speed, and thereafter to make the engine speed become equal to the target engine speed by gradually decreasing the temporarily increased engine speed;
a moving average calculating unit configured to detect the engine speed by use of an engine speed sensor, and to calculate a moving average value of the engine speed at intervals of a predetermined length of time;
an inclination calculating unit configured to calculate an inclination representing a change in the engine speed with time from an increase and decrease in the moving average value; and
a clutch controlling unit configured to control the connection and disconnection of the clutch,
wherein the clutch controlling unit is configured to connect the clutch in a case where a difference between a current engine speed detected by the engine speed sensor and the target engine speed determined by the target engine speed determining unit is not greater than a first predetermined value, an absolute value of a difference between the current engine speed and the moving average value calculated by the moving average calculating unit is not greater than a second predetermined value which is used in a settling judgment, and where the inclination calculated by the inclination calculating unit takes on a value representing a decreasing trend.

2. The hybrid vehicle of claim 1, wherein
the controller further comprises a throttle opening angle determining unit configured to determine an opening angle of the throttle valve of the engine from the target engine speed,
the clutch controlling unit is configured to put the driving wheel and the electric motor in a state of being connected to the engine via the clutch to enable the power to be transmitted,
the throttle valve is gradually opened on the basis of a throttle opening angle determined by the throttle opening angle determining unit,
wherein if a value obtained by subtracting the engine speed of a predetermined length of time earlier from the current engine speed is greater than 0, it is judged that the engine speed is in an increasing trend, and
wherein if the current engine speed is greater than the target engine speed beyond the second predetermined value, an opening of the throttle valve is increased, and a mode of the hybrid vehicle is switched from a motor driving mode to an engine driving mode.

3. The hybrid vehicle of claim 2, wherein the controller is configured to increase the opening of the throttle valve after the predetermined length of time.

4. The hybrid vehicle of claim 2, wherein zero torque control is performed on the electric motor after transition to the engine driving mode.

5. A hybrid vehicle, comprising:
power plant means for providing motive power for the vehicle, said power plant means comprising an electric motor and an engine;
clutch means for connecting and disconnecting the engine to and from a driving wheel and the electric motor thereby enabling power to be transmitted, the electric motor for transmitting power to the driving wheel;
throttle means for linking a throttle valve of the engine and an acceleration operator;
controller means for controlling operation of the power plant means, said controller means comprising
vehicle speed calculating means for calculating a vehicle speed from the number of revolutions of the electric motor;
target engine speed determining means for determining a target engine speed from the calculated vehicle speed in a case where the engine is started while the vehicle is in a state of being run by the electric motor;
start controlling means for starting the engine once the vehicle speed reaches a predetermined one while the vehicle is in the state of being run by the electric motor, temporarily increasing the engine speed in a way that makes the engine speed become larger than the determined target engine speed, and thereafter making the engine speed become equal to the target engine speed by gradually decreasing the temporarily increased engine speed;

moving average calculating means for detecting the engine speed by use of an engine speed sensor, and for calculating a moving average value of the engine speed at intervals of a predetermined length of time;

inclination calculating means for calculating an inclination representing a change in the engine speed with time from an increase and decrease in the moving average value; and clutch controlling means for controlling the connection and disconnection of the clutch means, and the clutch controlling means connects the clutch means in a case where a difference between a current engine speed detected by the engine speed sensor and the target engine speed determined by the target engine speed determining means is not greater than a first predetermined value; the absolute value of a difference between the current engine speed and the moving average value calculated by the moving average calculating means is not greater than a second predetermined value which is used in a settling judgment; and the inclination calculated by the inclination calculating means takes on a value representing a decreasing trend.

6. The hybrid vehicle according to claim 5, wherein the throttle means comprises a throttle-by-wire system.

7. The hybrid vehicle according to claim 5, wherein the controller means further comprises throttle opening angle determining means for determining an opening angle of the throttle valve of the engine from the target engine speed, the clutch controlling means puts the driving wheel and the electric motor in a state of being connected to the engine via the clutch in the way that enables the power to be transmitted, the throttle valve is gradually opened on the basis of a throttle opening angle determined by the throttle opening angle determining means, if a value obtained by subtracting the engine speed of a predetermined length of time earlier from the current engine speed is greater than 0, it is judged that the engine speed is in an increasing trend, and wherein if the current engine speed is greater than the target engine speed beyond the second predetermined value, an opening of the throttle valve is increased, and a mode of the hybrid vehicle is switched from a motor driving mode to an engine driving mode.

8. The hybrid vehicle according to claim 7, wherein the controller means is also for increasing the opening of the throttle valve after the predetermined length of time.

9. The hybrid vehicle according to claim 7, wherein zero torque control is performed on the electric motor after transition to the engine driving mode.

10. A method of controlling a hybrid vehicle, said method comprising:

calculating, with a processor, a vehicle speed based upon a number of revolutions of an electric motor;

determining, with the processor, a target engine speed from the calculated vehicle speed in a case where an engine is started while the vehicle is in a state of being run by the electric motor;

starting the engine once the vehicle speed reaches a predetermined speed while the vehicle is in a state of being run by the electric motor, temporarily increasing the engine speed in a way that makes the engine speed become larger than the determined target engine speed, and thereafter making the engine speed become equal to the target engine speed by gradually decreasing the temporarily increased engine speed;

detecting the engine speed with an engine speed sensor, and calculating, with the processor, a moving average value of the engine speed at intervals of a predetermined length of time;

calculating an inclination representing a change in the engine speed with time from an increase and decrease in the moving average value; and connecting a clutch, thereby connecting the engine to a driving wheel and the electric motor in a case where a difference between a current engine speed detected by the engine speed sensor and the target speed determined by the processor is not greater than a first predetermined value, an absolute value of a difference between the current engine speed and the moving average value is not greater than a second predetermined value which is used in a settling judgment, and where the calculated inclination takes on a value representing a decreasing trend.

11. The method according to claim 10, further comprising:

determining an opening angle of a throttle valve of the engine from the target engine speed;

opening the throttle valve based upon a throttle opening angle when the clutch controlling means connects the engine to the driving wheel and the electric motor;

judging that the engine speed is in an increasing trend if a value obtained by subtracting the engine speed of a predetermined length of time earlier from the current engine speed is greater than 0;

increasing an opening of the throttle valve if the current engine speed is greater than the target engine speed beyond the second predetermined value;

switching a mode of the hybrid vehicle from a motor driving mode to an engine driving mode.

12. The method according to claim 11, further comprising increasing the opening of the throttle valve after a predetermined length of time.

13. The method according to claim 11, further comprising performing zero torque control on the electric motor after transition to the engine driving mode.

* * * * *